B. GRANVILLE.
RESILIENT WHEEL.
APPLICATION FILED DEC. 23, 1914.
1,197,285.
Patented Sept. 5, 1916.
2 SHEETS—SHEET 1.
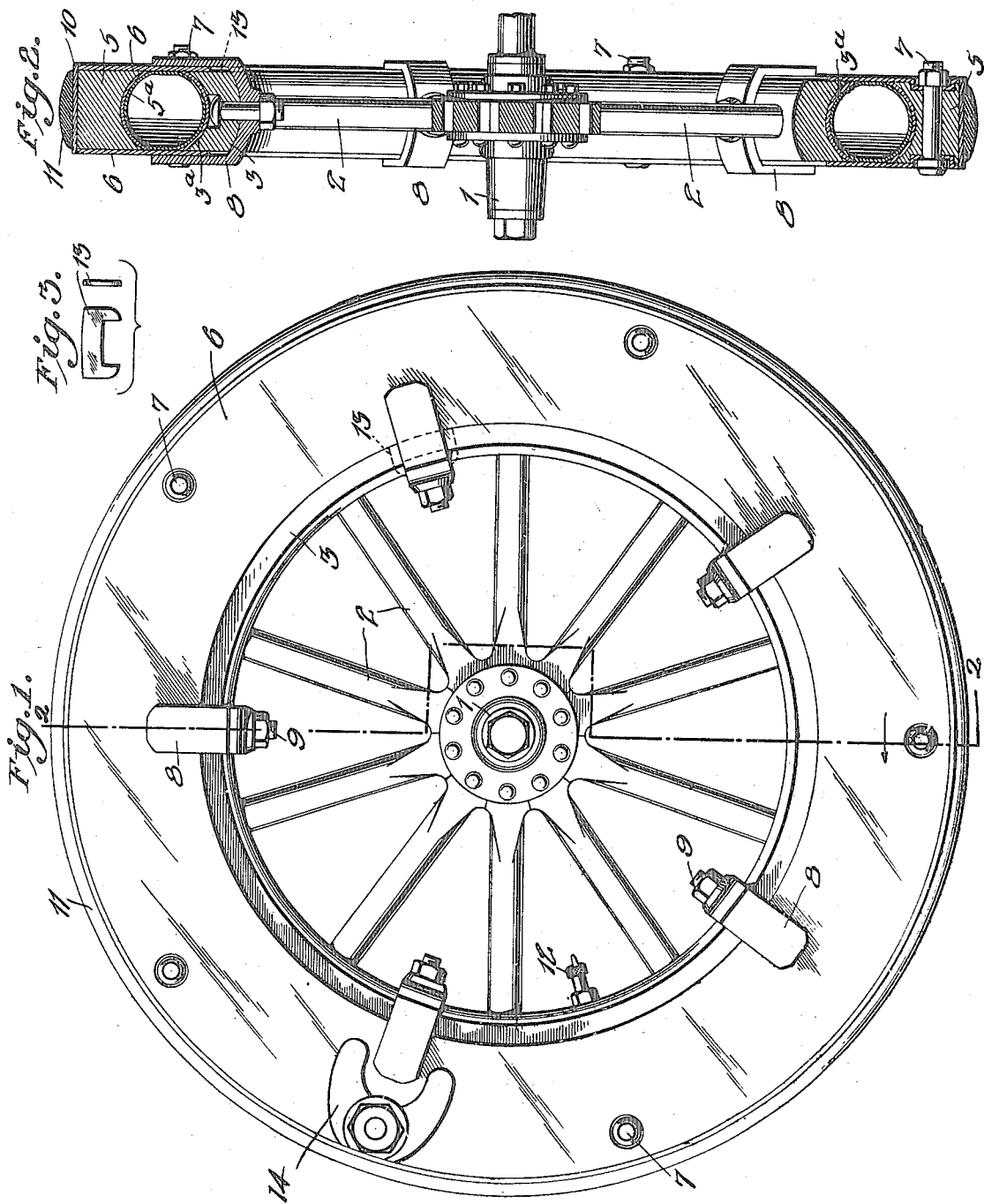
Attest:—
W. B. Rockwell
R. E. Durand
Inventor
Bernard Granville
By Spear Middleton
Donaldson & Spear
Attys.

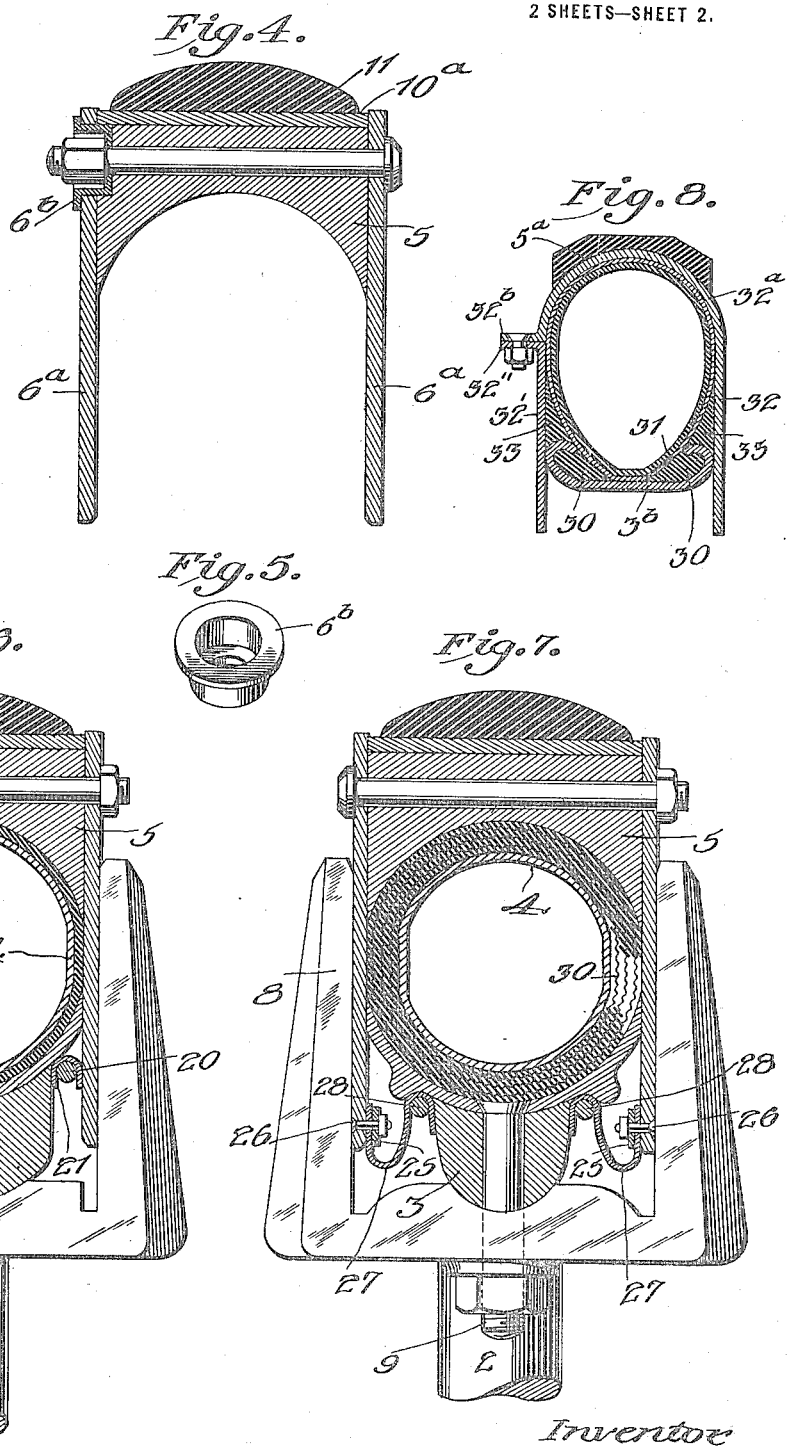

UNITED STATES PATENT OFFICE.

BERNARD GRANVILLE, OF NEW YORK, N. Y.

RESILIENT WHEEL.

1,197,285.  Specification of Letters Patent.  Patented Sept. 5, 1916.

Application filed December 23, 1914. Serial No. 878,793.

*To all whom it may concern:*

Be it known that I, BERNARD GRANVILLE, a citizen of the United States, residing at New York, N. Y., have invented certain new and useful Improvements in Resilient Wheels, of which the following is a specification.

My present invention relates to improvements in vehicle wheels having resilient rims or tires, and its object is to provide a construction which will secure the benefit of the ordinary pneumatic tire which will be free from the liability of puncture blowouts and rim cutting of the ordinary pneumatic tire and will be of a much more durable nature.

The invention includes the novel features of construction and arrangement and combination of parts, hereinafter described and particularly defined by the appended claims.

An embodiment of my invention is illustrated in the accompanying drawings, in which;

Figure 1 is a side elevation, and Fig. 2 is a transverse section on line 2—2 of Fig. 1, of a resilient wheel containing my improvements. Fig. 3 is a detailed view. Figs. 4, 5, 6 and 7 and 8 are views of modifications.

Referring by reference numerals to this drawing, 1 designates the hub and 2 the spokes and 3 the felly, all of which may be of the ordinary or any desired construction, except that the felly 3, which is preferably of wood, has a concave iron bound rim or face to form a seat, as indicated at 3ª, to receive the annular inflatable tube 4. Encircling this tube is an outer annular floating ring 5, which has an inward concave face 5ª to receive the outer portion of the periphery of the inflatable tube. This rim 5 has no positive connection with the inner rim, either as regards radial movement or circumferential movement, its resistance to inward or radial movement under the action of the load or inequalities of the road being due entire to the inflatable tube, which tube by its frictional engagement resists circumferential movement under driving strain. I thus secure a pneumatic cushion effect against radial and circumferential movements.

The felly 3 and rim 5 are held in alinement without interfering with their relative movements by side plates 6 secured to opposite sides of rim 5, by bolts 7, and extending inward to overlap the sides of the felly 3, and by U-shaped clips or guides 8 secured to the felly 3 by bolts 9. These bolts, preferably, have their heads within the felly, so that the nuts bear against the base of the clips 8, so that by removal of the nuts, the clips or guides may be readily slid from engagement with the side plates 6 and thereafter one or both of the side plates readily removed to permit access to the inflatable tube.

I prefer to provide the channeled or concaved faces of the felly 3 and the rim 5 with linings of a canvas or like material, which will afford a better bearing surface for the inflatable tube. The wood rim 5 may be provided with a steel rim or tire 10, which in its turn may be provided with a rubber tire 11. Any ordinary means may be used for inflating the tube or inflatable member, such as an air valve 12, which passes through the felly as usually practised.

From the foregoing construction, it will be seen that I secure all of the advantages present in the ordinary pneumatic tire without the dangers of puncturing, blowouts and rim cutting and without the liability of rapid wear. The inflatable member which I use preferably is a standard inner tube which may be reinforced by canvas or other material in a way to permit of inflation but prevent circumferential stretch in excess.

Figs. 6 and 7 show two methods of packing the tire so as to prevent dust or water finding its way between the side plates 6 and the felly 3. Fig. 6 illustrates a band of leather or other resilient packing material held in position against the felly 3 and the plates 6 by an expanding ring 20. This ring normally is under expansive tension and holds the packing material 21 firmly in place. Fig. 7 illustrates a plate 25 clamping a waterproof material 27 in the form of a large washer, ring or annular disk to the plates 6 by means of rivets 26, the inner end or edge of the canvas ring 27 being held firmly against the felly 3 by means of an expanding ring 28 or by any other conveniently detachable method. The width of the canvas ring 27 is sufficient to permit the plates 6 to have full movement without taking up all the bagging or slack in the canvas ring 27. The canvas ring forms a perfectly tight joint between the plates 6 and the felly 3 at the same time permitting free movement of the outer rim 5.

At 13 are indicated wedges or keys which are placed in the slots between the steel rims or disks 6 and the guides 8. They are made preferably forked similar to keys of puppet-valves so that they cannot fall out. They are inserted by loosening the nuts 9, which allows the clamps 8 to drop down sufficiently to insert the wedges, the nuts 9 being afterward tightened and in this way in case of an accident occurring to the inner tube, the wheel can be made solid and can be run home on, as a solid rubber tired wheel. Usually as many wedges are employed on a wheel as there are clamps or U-shaped pieces. These guides or U-shaped pieces can be fastened to the spokes or other parts of the wheel other than the felly, if preferred.

In the form shown in Figs. 4 and 5 I make the side plates 6ª extend outward and overlap the edges of the iron rim 10ª, and also provide cup-shaped steel washer 6ᵇ to receive the heads of the bolts and nuts, thereby avoiding the necessity of cupping the side plates as shown in Fig. 2. When washers 6ᵇ are used the side plates or disks are provided with holes sufficiently large to receive the cupped portion of the washer.

I have referred above to the tube as being a standard inner tube reinforced to withstand wear and circumferential strain, but in large wheels or those designed for heavier work the tube may be more completely reinforced and might be made of crimped canvas of one or more thicknesses embedded in the rubber as shown in Fig. 7 at 30. The object of the crimping of the reinforcing material is to permit of the tube being equally inflatable but to resist tension or circumferential strain or elongation. In such heavier wheels I may also provide means to prevent or check excessive circumferential strain on the inflatable member without interfering with the normal floating nature of the outer rim. Such means might consist of projections or lugs 14 on the side plates between the guides or U-shaped clips 8.

In Fig. 8 I have shown an embodiment of my invention adapted for use in connection with an ordinary clencher ring whereby the necessity of providing a special inner rim or felly is avoided. In this figure the ordinary clencher ring is indicated at 3ᵇ, and to provide the proper seat for the tube I provide sections of rubber and fabric indicated at 30 shaped to conform to the channel of the rim, and these sections may be secured to a liner of bias cut fabric indicated at 31, and adapted to be sprung over the rim in the same manner that an ordinary shoe is applied. The outer rim is indicated in this figure at 5ª, and is intended to be representative of any suitable outer rim, and a means for maintaining the inner felly and outer rim in alinement comprises the side plates 32 and 32', one of which may be continued around to form a crown portion 32ª to which the outer tire or tread portion is secured, the side plate 32' being removable and having a laterally projecting flange 32'' bolted to a similar flange 32ᵇ carried by the crown part 32ª. In addition to the parts 30 for fitting within the channel rim I also provide parts 33 of similar material secured to the fabric liner, shaped on the inside to form a further seat for the inner tube or inflatable member, and on the outside having parallel walls forming guides for the side plates 32 and 32'.

Having thus described my invention, what I claim is:—

1. A resilient wheel comprising an inner felly and an outer rim spaced therefrom, an annular inflatable member between said parts and side plates removably secured to the outer rim and projecting inward and overlapping the sides of the felly and having sliding contact with U-shaped clips or guides detachably secured to a fixed part of the wheel, said clips or guides having arms slidably embracing said plates and removable means adapted to be placed between said clips or guides and edges of the side plates to prevent inward movement of said side plates, substantially as described.

2. A resilient vehicle wheel comprising an inner felly and an outer floating rim spaced therefrom, an inflatable member between said parts, side members secured to the outer floating rim, U-shaped guides having slidable bearing on the outside of said side members and means fastened to said side members coöperating with said U-shaped guides for limiting the relative circumferential movement of the parts.

BERNARD GRANVILLE.

Witnesses:
H. C. BAILEY,
ADOLPH S. WASSERMAN.